US012618788B2

(12) United States Patent
　　　 Kaplan

(10) Patent No.: US 12,618,788 B2
(45) Date of Patent: May 5, 2026

(54) SYSTEM AND METHOD FOR DENOISING A REGION OF INTEREST OF A PATTERN

(71) Applicant: ETROLOGY, LLC, Sandy, OR (US)

(72) Inventor: Vladislav Kaplan, Raanana (IL)

(73) Assignee: ETROLOGY, LLC, OR (US)

( * ) Notice: Subject to any disclaimer, the term of this patent is extended or adjusted under 35 U.S.C. 154(b) by 431 days.

(21) Appl. No.: 18/308,185

(22) Filed: Apr. 27, 2023

(65) Prior Publication Data

US 2024/0361262 A1　　Oct. 31, 2024

(51) Int. Cl.

| *G01N 23/22* | (2018.01) |
| *G01N 23/20* | (2018.01) |
| *G01N 23/203* | (2006.01) |
| *G01N 23/2206* | (2018.01) |
| *G01N 23/2251* | (2018.01) |
| *G06T 5/50* | (2006.01) |
| *G06T 5/70* | (2024.01) |

(52) U.S. Cl.
CPC ....... *G01N 23/2206* (2013.01); *G01N 23/203* (2013.01); *G01N 23/2251* (2013.01); *G06T 5/50* (2013.01); *G06T 5/70* (2024.01); *G01N 2223/6116* (2013.01); *G06T 2207/10061* (2013.01); *G06T 2207/20216* (2013.01)

(58) Field of Classification Search
CPC ............. G01N 23/2206; G01N 23/203; G01N 23/2251; G01N 2223/6116; G06T 5/70; G06T 5/50; G06T 2207/10061; G06T 2207/20216
See application file for complete search history.

(56) References Cited

U.S. PATENT DOCUMENTS

2013/0146221 A1 * 6/2013 Kolmakov .............. H01J 37/20
156/252

* cited by examiner

*Primary Examiner* — Nicole M Ippolito
(74) *Attorney, Agent, or Firm* — Stanzione & Associates, PLLC; Patrick Stanzione

(57) ABSTRACT

A system and method for denoising a grey scale image of a pattern on a substrate, including: scanning a gaussian beam consecutively across scanlines extending along an x direction, wherein the scan lines are disposed adjacent to each other in a y direction within a predetermined region of the pattern, obtaining waveforms from secondary electrons and backscattered electrons reflected from the scanned pattern; converting the waveforms into a grey scale image, and applying a gaussian weighted distribution for each of the scan lines of the grey scale image and the neighboring scan lines of the grey scale image to account for the impact of the neighboring scan lines to each scan line.

10 Claims, 4 Drawing Sheets

FIG. 1
(Conventional)
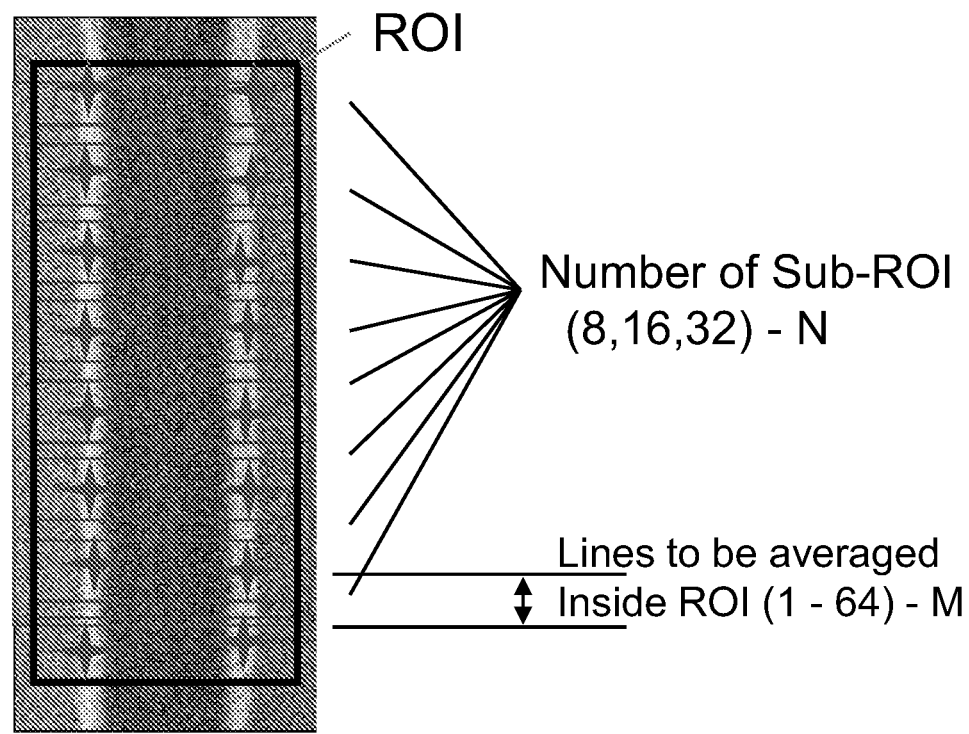
ROI
Number of Sub-ROI
(8,16,32) - N
Lines to be averaged
Inside ROI (1 - 64) - M

FIG. 2
(Conventional)
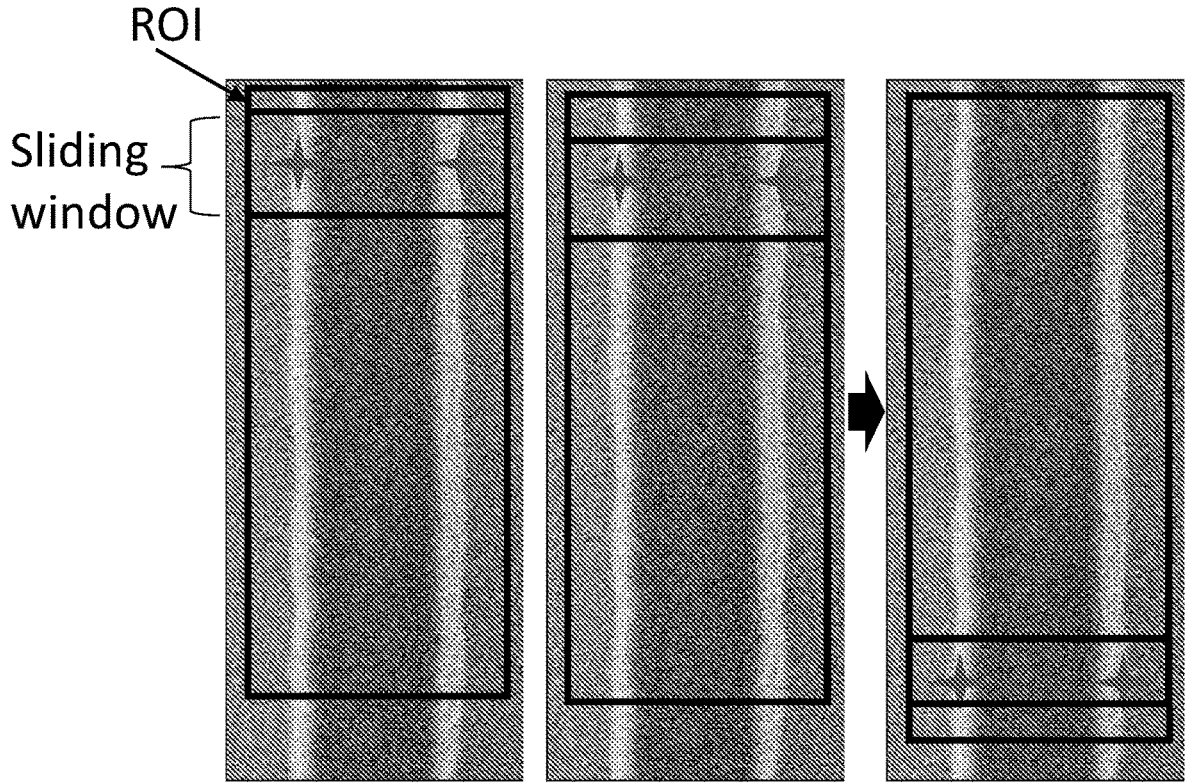

SYSTEM AND METHOD FOR DENOISING A REGION OF INTEREST OF A PATTERN

STATEMENT REGARDING FEDERALLY SPONSORED RESEARCH OR DEVELOPMENT

Not applicable.

COPYRIGHT NOTICE

BACKGROUND OF THE INVENTIVE CONCEPT

1. Field of the Invention

The present inventive concept relates to denoising of critical dimension scanning electron microscopy. More particularly, but not exclusively, this inventive concept relates to denoising of critical dimension scanning electron microscopy by gaussian weighted averaging of scanlines of a pattern.

Description of the Related Art

Measuring a pattern, generally formed within a substrate, in order to detect imperfections which can cause faulty circuits, is a well-known process. This process is referred to as critical dimension (CD) scanning electron microscopy. Generally, in CD scanning electron microscopy, an electron image is obtained from an area of a sample to be tested. The area to be sampled comprises a pattern and the electron image obtained comprises multiple lines scanned with an electron beam across the pattern, where each scanned line includes information obtained by scanning the electron beam over a scanline across the pattern and between the vertical edges of the pattern (a leading edge and a trailing edge of the pattern). For each scan line two peaks (representing the edges) must be located, and the distance between the peaks (the critical dimension (CD)) is measured.

Waveforms are obtained and stored as result of the interaction of scanning an electron beam on a surface along the scan lines across the pattern, and these waveforms are converted into a grey scale image of the pattern. However, these resulting waveforms converted into a grey scale image, in most cases, are very noisy and difficult to read. Furthermore, measuring each scanline separately in order to determine the edges of the pattern creates a highly inaccurate measurement. Accordingly, "denoising" of the obtained grey scale image is a highly important part of image preprocessing techniques.

A well-known technique for denoising is called averaging. Averaging is a process of taking all values sitting at the same location X between neighboring scan lines and replacing a particular scan line of interest with averaged values for each X. The resulting averaged scan line is generally much cleaner and easier for reading to determine critical dimensions (CD) of a pattern or other object. This process is generally performed for all scan lines in the resulting waveform to obtain a new waveform which is cleaner and easier to measure.

FIG. 1 illustrates one process of denoising by averaging. Here the process is performed by averaging all the scan lines within a region of interest (ROI) (i.e., a designated window) with the same scale factor. In other words, any scan line before averaging will be provided with the same weight. The averaging of all scan lines is performed using the following equation:

$$\bar{x} = \frac{1}{n}\sum_{i=1}^{n} x_i = \frac{1}{n}(x_1 + \ldots + x_n),$$

where x1, x2 . . . xn are the scanlines. The results from averaging each scan line is poor sensitivity or a poor signal-to-noise ratio (SNR), since neighboring scan lines throughout the entire window are averaged with the same weight as the center scan line, while in fact neighboring scan lines have an effect, although less intense, on the center scan line being averaged.

FIG. 2 illustrates another process of denoising by averaging. Here the process is performed by using a "sliding window" within the region of interest. More specifically, the sliding window moves one scan line down at a time, each time covering the same number of scan lines, but progressing downward until each scan line is averaged. The averaging of all scan lines is performed, as above, using the following equation:

$$\bar{x} = \frac{1}{n}\sum_{i=1}^{n} x_i = \frac{1}{n}(x_1 + \ldots + x_n),$$

where x1, x2 . . . xn are the scanlines. The results from averaging each scan line via the "sliding window" method is also poor sensitivity or a poor SNR, since neighboring scan lines throughout the entire window are averaged with the same weight as the center scan line, while in fact neighboring scan lines have an effect, although less intense, on the center scan line being averaged.

Accordingly, there is a need to perform a process of denoising scan lines by taking into account the positioning of the scan lines, and therefore the impact of the scan lines depending on the proximity of the neighboring scan lines from the scan line being averaged.

Accordingly, there is also a need to perform a process of denoising scan lines by applying a gaussian weighted scale to the scan lines within a region of interest of the scan lines detected.

SUMMARY OF THE INVENTIVE CONCEPT

The present general inventive concept provides a system and method for denoising of critical dimension scanning electron microscopy. More particularly, but not exclusively, this inventive concept provides a system and method for denoising of critical dimension scanning electron microscopy by gaussian weighted averaging of scanlines of a pattern.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a method of denoising secondary and backscattered electron images obtained from a predetermined area of interest of a pattern, the method comprising: scanning an electron beam over scan lines across the pattern a plural of times in an x direction, wherein the scan lines are disposed adjacent to each other in a y direction within a predetermined area of interest of the pattern; obtaining a secondary electron image of the predetermined area of interest and a backscattered electron image of the predetermined area of interest; and applying a weight of one to a normalized scan line and a gaussian weighed distribution to neighboring scan lines, wherein the gaussian weighted distribution is determined according to each neighboring scan line position.

In an exemplary embodiment the gaussian weighted distribution for each scan line is applied using the equation:

$$Weight(x) = e^{(-1/2)(\frac{x-\mu}{\sigma})^2},$$

where $\sigma$ represents the width of the gaussian, $\mu$ represents the location on a maximum point, and "x" represents the line currently being processed.

In another exemplary embodiment the pattern is formed in a substrate.

In another exemplary embodiment each scan line begins at a first edge of the pattern and ends at a second edge of the pattern.

The foregoing and/or other features and utilities of the present general inventive concept may also be achieved by providing a non-transitory computer readable medium that stores instructions for: scanning an electron beam over scan lines across the pattern a plural of times in an x direction, wherein the scan lines are disposed adjacent to each other in a y direction within a predetermined area of interest of the pattern; obtaining a secondary electron image of the predetermined area of interest and a backscattered electron image of the predetermined area of interest; and applying a weight of one to a normalized scan line and a gaussian weighed distribution to neighboring scan lines, wherein the gaussian weighted distribution is determined according to each neighboring scan line position.

In an exemplary embodiment the gaussian weighted distribution for each scan line is applied using the equation:

$$Weight(x) = e^{(-1/2)(\frac{x-\mu}{\sigma})^2},$$

where $\sigma$ represents the width of the gaussian, $\mu$ represents the location on a maximum point, and "x" represents the line currently being processed.

In an exemplary embodiment the pattern is formed in a substrate.

In another exemplary embodiment each scan line begins at a first edge of the pattern and ends at a second edge of the pattern.

The foregoing and/or other features and utilities of the present general inventive concept may also be achieved by providing a system for denoising secondary and backscattered electron images obtained from a predetermined area of interest of a pattern, the system comprising: a secondary electron detector to detect secondary scattered electrons reflected from a pattern in response to scanning a gaussian beam across the pattern consecutive times within a region of interest of the pattern, and to store the detected secondary scattered electrons as waveforms; a backscatter electron detector to detect backscattered electrons reflected from a pattern in response to scanning a gaussian beam across the pattern consecutive times within a region of interest of the pattern, and store the backscattered electrons as waveforms; and a processor to convert the stored secondary electron waveforms and the backscattered electron waveforms together as a grey scale image of the region of interest of the pattern, to apply a weight of one to a normalized scan line of the grey scale image and a gaussian weighed distribution to neighboring scan lines of the grey scale image, wherein the gaussian weighted distribution is determined according to each neighboring scan line position.

In an exemplary embodiment the processor applies the gaussian weighted distribution for each scan line using the equation:

$$Weight(x) = e^{(-1/2)(\frac{x-\mu}{\sigma})^2},$$

where $\sigma$ represents the width of the gaussian, $\mu$ represents the location on a maximum point, and "x" represents the line currently being processed.

In another exemplary embodiment the pattern is formed in a substrate.

BRIEF DESCRIPTION OF THE DRAWINGS

These and/or other features and utilities of the present inventive concept will become apparent and more readily appreciated from the following description of the embodiments, taken in conjunction with the accompanying drawings of which:

FIG. 1 illustrates a conventional method of denoising by averaging scan lines;

FIG. 2 illustrates another conventional method of denoising by averaging scan lines;

Figure 3:
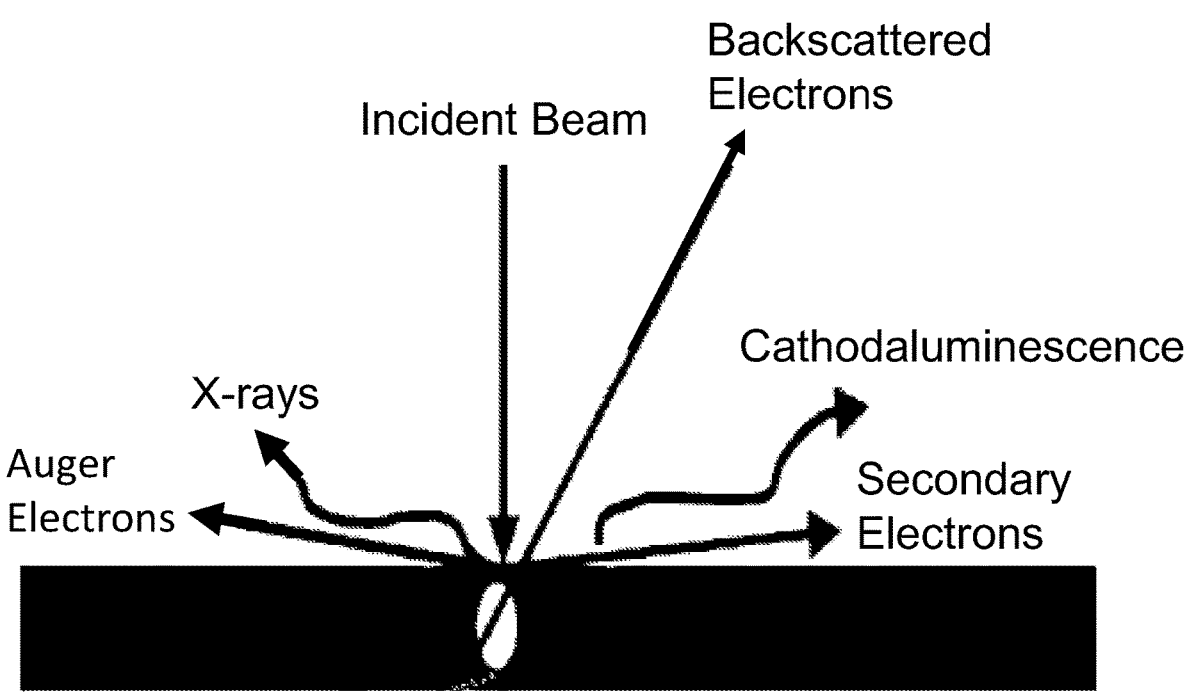
FIG. 3 illustrates secondary and backscattered electrons to be detected from scanning an electron beam across a pattern.

The drawings illustrate a few example embodiments of the present inventive concept, and are not to be considered limiting in its scope, as the overall inventive concept may admit to other equally effective embodiments. The elements and features shown in the drawings are to scale and attempt to clearly illustrate the principles of exemplary embodiments of the present inventive concept. In the drawings, reference numerals designate like or corresponding, but not necessarily identical, elements throughout the several views.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept are omitted.

It will be understood that although the terms "first" and "second" are used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" and "module" indicate a unit to process at least one function or operation, wherein the unit and the block may be embodied as hardware or software or embodied by combining hardware and software.

Hereinafter, one or more exemplary embodiments of the present general inventive concept will be described in detail with reference to accompanying drawings.

The subject matter regarded as the embodiments of the disclosure is particularly pointed out and distinctly claimed in the concluding portion of the specification. The embodiments of the disclosure, however, both as to organization and methods of operation, together with objects, features, and advantages thereof, may best be understood by reference to the following detailed description when read with the accompanying drawings.

Because the illustrated embodiments of the disclosure may for the most part, be implemented using electronic components and circuits know to those skilled in the art, details will not be explainer in any greater extent than that considered necessary as illustrated, for the understanding and appreciation of the underlying concepts of the present example embodiments described herein and in order not to obfuscate or distract from the overall inventive concept as described herein.

Any reference in the specification to a method should be applied mutatis mutandis to a system capable of executing the method and should be applied mutatis mutandis to a computer readable medium that is non-transitory and stores process steps for executing the method.

Any reference in the specification to a system should be applied mutatis mutandis to a method that may be executed by the system and should be applied mutatis mutandis to a computer readable medium that is non-transitory and stores process steps for executing the system.

Any reference in the specification to a computer readable medium that is non-transitory should be applied mutatis mutandis to a method that may be applied when executing instructions stored in the computer readable medium and should be applied mutatis mutandis to a system configured to execute the process steps stored in the computer readable medium.

There may be provided a system, a method, and a non-transitory computer readable medium for denoising of critical dimension scanning electron microscopy by gaussian weighted averaging of scan lines. Example embodiments of the present general inventive concept are directed to denoising of critical dimension scanning electron microscopy by gaussian weighted averaging of scan lines.

An electron beam generator, or other particle beam generator, is well-known to be used to generate a gaussian beam. This beam can be scanned along scan lines across a pattern in or on a substrate. The beam is scanned consecutively across a pattern, one scan line after another, to cover a field of view (FOV) of the pattern. A region of interest (ROI) is referred to as a portion of the FOV which will be extracted for processing, which will also be referred to as a window of scan lines throughout this detailed description.

When an electron beam is scanned across a pattern, both secondary electrons and backscattered electrons are emitted, which can be detected by a secondary electron detector and a backscattered detector, respectively, in order to obtain electron image data for each scanline. More specifically, for every instance of time ti a gaussian primary beam (i.e., the electron beam) will move over the surface of a pattern (i.e., in the x direction) at a location $X_i$, $Y_i$. Every intersection between the gaussian primary beam and the surface of the pattern along the x direction at an instance of time ti results in the ejection of secondary and backscattered electrons. FIG. 3 illustrates the emission of secondary electrons and backscatter electrons from the incident electron beam onto a pattern. It is to be noted that other types of electrons are also ejected from the pattern as a result of the electron beam intersecting with the surface of the pattern, which will not be addressed here in order to provide brevity of the detailed description.

It is well known that different amounts of ejected secondary electrons and ejected backscattered electrons occur depending on whether the beam is intersecting with an edge or with a flat region of the pattern. The ejected secondary electrons and backscattered electrons are converted to a grey level signal by a respective photomultiplier detector(s) (PMT) and a video multiplier. The collection of these signals over all points $(X_i, Y_i)$ located along the pattern will form a 2D image at grey scale level. This 2D image is stored in a memory and can be transferred to a CRT/LCD screen. However, since there is a substantial amount of both secondary and backscattered electrons, this results in a substantial amount of noise within the grey scale level image. Accordingly, each scan line needs to be cleaned of noise. Conventionally scan lines have been cleaned by averaging the scan lines, one line at a time, each given the same weight. However, in the case where the pixel size of the image is smaller than the width of the primary beam, each scan line includes beam matter interaction for 5 or more sigma ($\sigma$) values. Sigma ($\sigma$) represents the width of the gaussian. In other words, it can be assumed that every scan line has a leakage of the signal from neighboring lines, and this leakage of the neighboring scan lines should be included in the averaging process in order to accurately average each scan line. Therefore, instead of using the well-known averaging equation $$\bar{x} = \frac{1}{n}\sum_{i=1}^{n} x_i = \frac{1}{n}(x_1 + \ldots + x_n)$$

to average the scan lines, in order to denoise the overall grey scale image, the present inventive concept introduces the use of a normalized or gaussian distribution $$\text{Weight}(x) = e^{(-1/2)(\frac{x-\mu}{\sigma})^2}$$

equation to determine the weight of a main scan line (the scan line being processed) and the weight of its neighboring scan lines in order to accurately average the scan lines and more accurately denoise the grey scale image obtained from scanning an electron beam across a pattern within a region of interest (ROI) within a feature of interest (FOI). From here on the detailed description will only refer to the ROI, which is the area that will be processed according to the embodiments described below. As pointed out above, sigma (σ) represents the width of the gaussian. The mean (μ) refers to the location on the maximum point, and "x" refers to the line being read.

Figure 4:
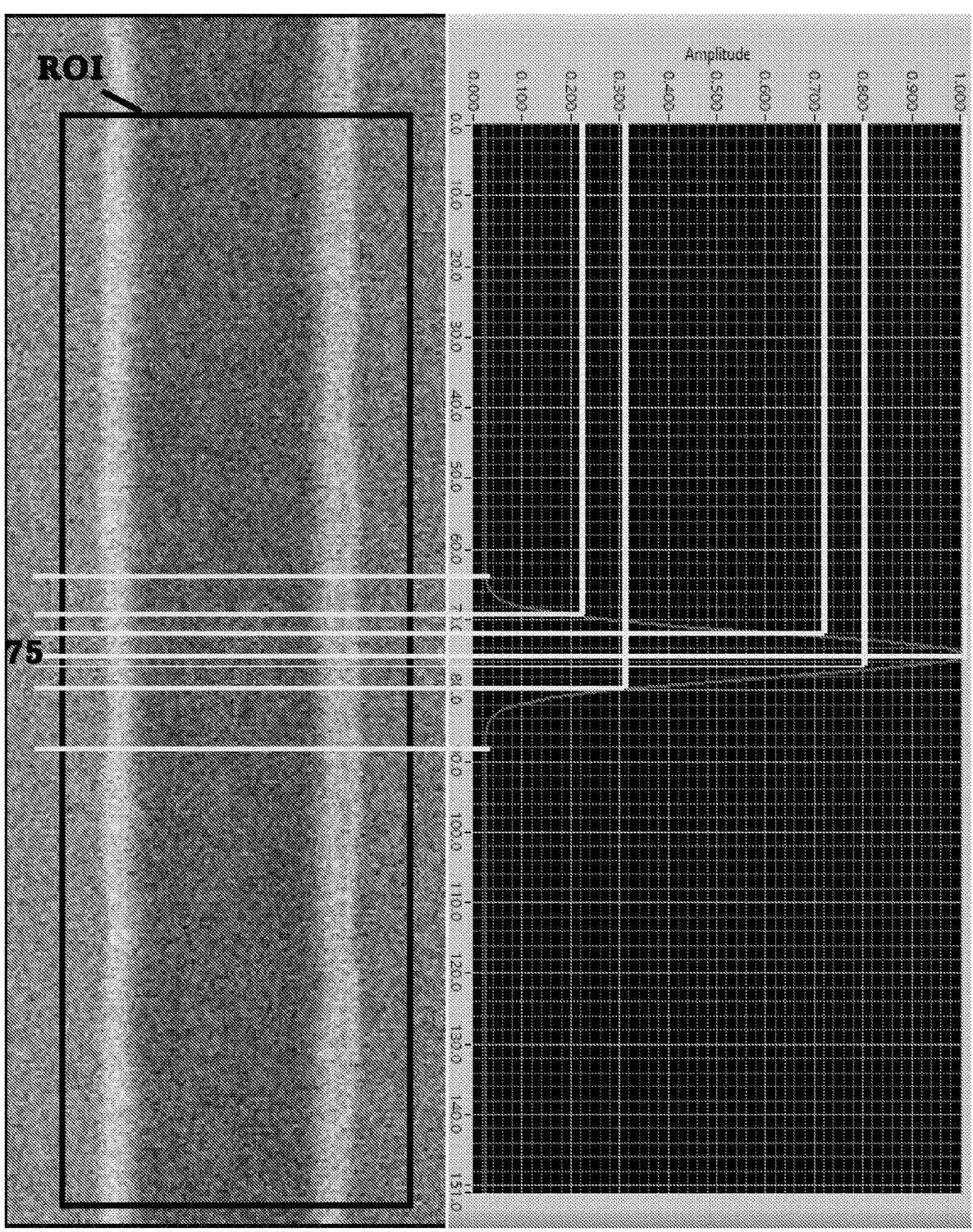
FIG. 4 illustrates a process for denoising detected electrons from scanning an electron beam across a pattern, according to an example embodiment of the present inventive concept.

An example of the present inventive process will be described with reference to FIG. 4. Referring to FIG. 4, a region of interest (ROI) includes 151 scan lines in which an electron beam is scanned across a pattern on a substrate. Here the scan line 75 is illustrated, as an example, as being processed to calculate the weight for this scan line, where x=75, and the mean (μ)=75. Sigma (σ) in this example is selected as =3. In other words, the normalized gaussian is centered at 75. Here the weight of scan line (75), by applying the gaussian weight distribution equation $$\text{Weight}(x) = e^{(-1/2)(\frac{x-\mu}{\sigma})^2} = 1.$$

This same process should be performed for every scan line to acquire the weights of each scan line. For example, the weight of scan lines 74 and 76 (W(74) and W(76)), which are direct neighboring scan lines of scan line 75, will have a weight=0.7251076782148385, the weight of scan lines 73 and 77 (W(73) and W(77)), which are the next further neighboring scan lines from scan line 75, will have a weight=0.26675220745079675, and the weight of scan lines 72 and 78 (W(72) and W(78)), which are still further from scan line 75, will have a weight=0.050382983990519596, etc. Accordingly, it is apparent that with sigma (σ)=3, any scan line more than 4 rows away will be virtually zero in value. Then the calculated coefficient on every raw scan line will be multiplied accordingly and all of them will be averaged, creating a clean scan line 75. This process is preferably performed from scan line 0 to the last scan line of the waveform being cleaned (the full range of ROI in the Y direction), which in the case of FIG. 4 is scan line 151. This approach is referred to as the "scanline gaussian weighting average approach," which much more closely reflects the physical reality of the beam layer interaction. This illustrates that the impact of neighboring scan lines is much higher than more distant scan lines. In the case of a pixel size<the primary beam, a scan line represents beam matter interaction for 5 or more sigma values, and therefore it can be assumed that every scan line has leakage of a signal from neighboring scan lines. Accordingly, the neighboring scan lines need to be included in the gaussian averaging equation.

While certain features of the example embodiments of the present inventive concept as described herein have been illustrated and described, many modifications, substitutions, changes, and equivalents will now occur to those of ordinary skill in the art. It is therefore to be understood that the appended claims are intended to cover all such modifications and changes as fall within the spirit and scope of the embodiments as described herein.

The embodiments described herein may also be implemented in a computer program to be used to run a computer system, at least including code portions for performing process steps according to the embodiments when run on a programmable apparatus, such as a computer system, or enabling a programmable apparatus to perform functions of a device or system according to the example embodiments.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of denoising secondary and backscattered electron images obtained from a predetermined area of interest of a pattern, the method comprising:

scanning an electron beam over scan lines across the pattern a plural of times in an x direction, wherein the scan lines are disposed adjacent to each other in a y direction within a predetermined area of interest of the pattern;

obtaining a secondary electron image of the predetermined area of interest and a backscattered electron image of the predetermined area of interest; and applying a weight of one to a normalized scan line and a gaussian weighed distribution to neighboring scan lines, wherein the gaussian weighted distribution is determined according to each neighboring scan line position and wherein the gaussian weighed distribution equation is:

$$\text{Weight}(x) = e^{(-1/2)(\frac{x-\mu}{\sigma})^2} = 1,$$

σ represents the width of the gaussian, x represents the scan line being processed and μ represents the mean of the scan line.

2. The method according to claim 1, wherein the gaussian weighted distribution for each scan line is applied using the equation:

$$\text{Weight}(x) = e^{(-1/2)(\frac{x-\mu}{\sigma})^2},$$

where σ represents the width of the gaussian, μ represents the location on a maximum point, and "x" represents the line currently being processed.

3. The method according to claim 1, wherein the pattern is formed in a substrate.

4. The method according to claim 1, wherein each scan line begins at a first edge of the pattern and ends at a second edge of the pattern.

5. A non-transitory computer readable medium that stores instructions for:

scanning an electron beam over scan lines across the pattern a plural of times in an x direction, wherein the scan lines are disposed adjacent to each other in a y direction within a predetermined area of interest of the pattern;

obtaining a secondary electron image of the predetermined area of interest and a backscattered electron image of the predetermined area of interest; and applying a weight of one to a normalized scan line and a gaussian weighed distribution to neighboring scan lines, wherein the gaussian weighted distribution is determined according to each neighboring scan line position and wherein the gaussian weighed distribution equation is:

$$Weight(x) = e^{(-1/2)(\frac{x-\mu}{\sigma})^2} = 1,$$

$\sigma$ represents the width of the gaussian, x represents the scan line being processed and $\mu$ represents the mean of the scan line.

6. The non-transitory computer readable medium according to claim 5, wherein the gaussian weighted distribution for each scan line is applied using the equation:

$$Weight(x) = e^{(-1/2)(\frac{x-\mu}{\sigma})^2},$$

where $\sigma$ represents the width of the gaussian, $\mu$ represents the location on a maximum point, and "x" represents the line currently being processed.

7. A system for denoising secondary and backscattered electron images obtained from a predetermined area of interest of a pattern, the system comprising:

a secondary electron detector to detect secondary scattered electrons reflected from a pattern in response to scanning a gaussian beam across the pattern consecutive times within a region of interest of the pattern, and to store the detected secondary scattered electrons as waveforms;

a backscatter electron detector to detect backscattered electrons reflected from a pattern in response to scanning a gaussian beam across the pattern consecutive times within a region of interest of the pattern, and store the backscattered electrons as waveforms; and a processor to convert the stored secondary electron waveforms and the backscattered electron waveforms together as a grey scale image of the region of interest of the pattern, to apply a weight of one to a normalized scan line of the grey scale image and a gaussian weighed distribution to neighboring scan lines of the grey scale image, wherein the gaussian weighted distribution is determined according to each neighboring scan line position and the gaussian weighed distribution equation is:

$$Weight(x) = e^{(-1/2)(\frac{x-\mu}{\sigma})^2} = 1,$$

$\sigma$ represents the width of the gaussian, x represents to the scan line being processed and $\mu$ represents the mean of the scan line.

8. The system according to claim 7, wherein the processor applies the gaussian weighted distribution for each scan line using the equation:

$$Weight(x) = e^{(-1/2)(\frac{x-\mu}{\sigma})^2},$$

where $\sigma$ represents the width of the gaussian, $\mu$ represents the location on a maximum point, and "x" represents the line currently being processed.

9. The system according to claim 7, wherein the pattern is formed in a substrate.

10. The system according to claim 7, wherein the processor converts the stored secondary electron waveforms and the backscattered electron waveforms together as a grey scale image using a photomultiplier detector (PMT) and a video multiplier.

\* \* \* \* \*